Jan. 3, 1967  C. K. CHATTEN ETAL  3,296,583
HYDROSTATIC PRESSURE RESPONSIVE APPARATUS
Filed June 22, 1965  2 Sheets-Sheet 1
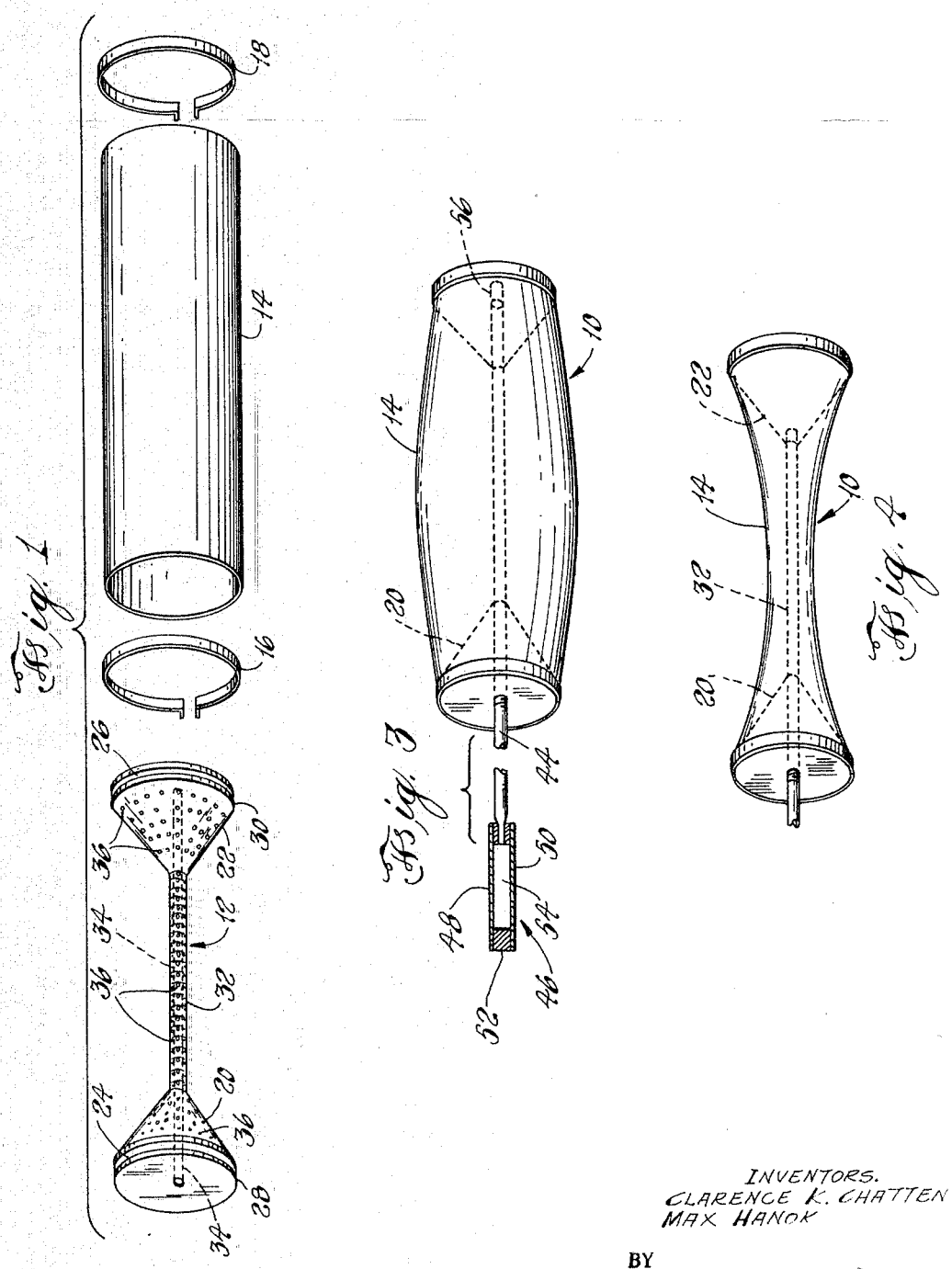
INVENTORS.
CLARENCE K. CHATTEN
MAX HANOK
BY
ATTORNEYS

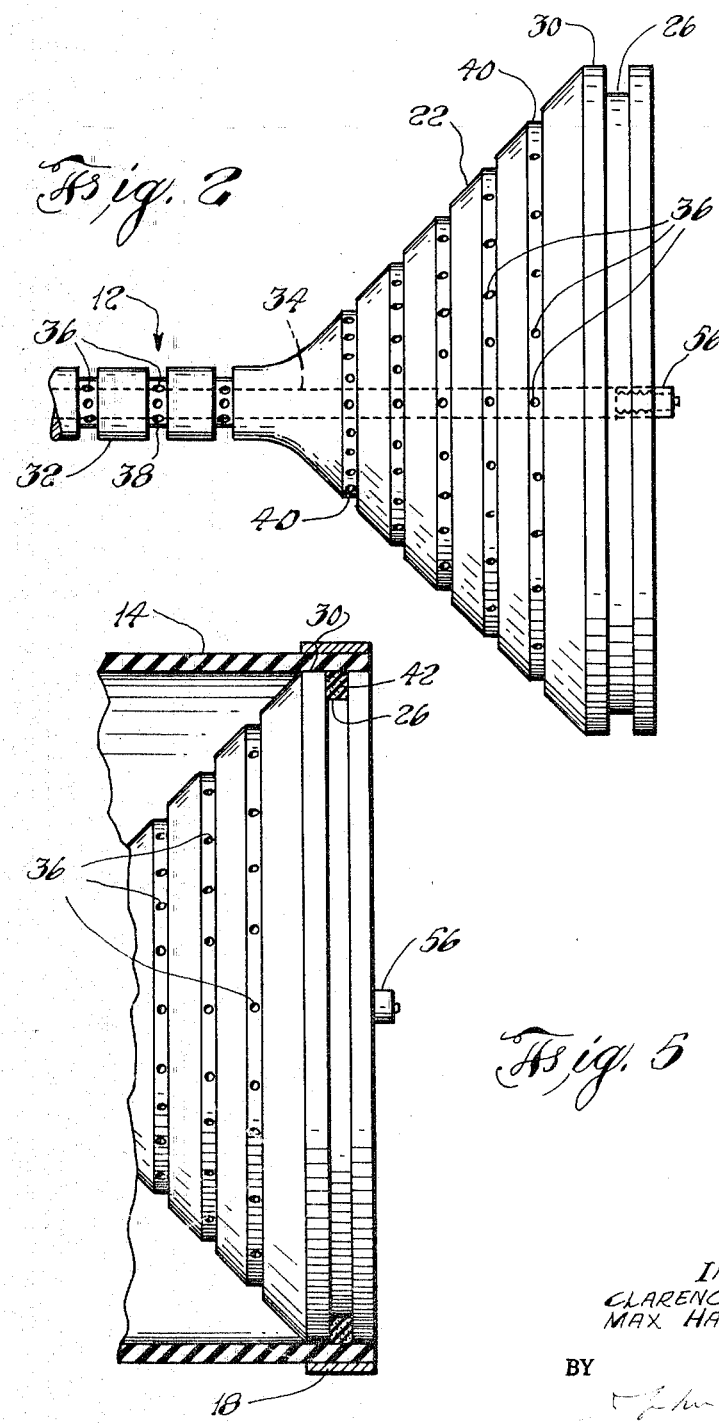

United States Patent Office 3,296,583
Patented Jan. 3, 1967

3,296,583
HYDROSTATIC PRESSURE RESPONSIVE
APPARATUS
Clarence K. Chatten, Jackson Heights, and Max Hanok, Elmhurst, N.Y., assignors to the United States of America as represented by the Secretary of the Navy
Filed June 22, 1965, Ser. No. 466,132
7 Claims. (Cl. 340—8)

The invention described herein may be manufactured and used by or for the Government of the United States of America for governmental purposes without the payment of any royalties thereon or therefor.

This invention relates to an improved hydrostatic pressure responsive device and to an improved depth compensated transducer apparatus particularly suitable for use in variable depth sonar equipment.

The subject invention is useful in any underwater application where the development of a gas pressure automatically and corresponding to an ambient hydrostatic pressure is required. Examples of such equipment include variable depth sonar equipment and pressure responsive fathometers.

It has been recognized for some time that pressure compensation is required for encapsulated air backed piezoelectric elements in transducers under high hydrostatic pressure to avoid cracking of the delicate elements. Conventionally this has been accomplished by Scuba tank equipment and relief valve means. This approach has been unsatisfactory in that the compensation is not automatic, the tanks quickly expend their air supply and the relief valves are a source of frequent trouble.

It is a general object of this invention to provide an improved hydrostatic pressure responsive device for use on a variable ambient pressure to produce a gas pressure corresponding to the ambient pressure.

A further object is to provide an improved hydrostatic pressure responsive device comprising an elastomeric envelope and apertured supporting frame formed with grooves to reduce the possibility of fault due to excessive hydrostatic pressures and at the same time maintain reliable and rapid response to ambient hydrostatic pressure.

Another object is to provide an improved automatic depth compensated transducer apparatus particularly adaptable to a variety of air backed type transducer elements and to the problems of optimum shape for movement through the water and maximum ratio of collapsible to non-collapsible gas volume in the system.

A further object is to provide an improved hydrostatic pressure responsive device on which set of the envelope is maintained minimum such that maximum and uniform return of the envelope to original condition is obtained upon reduction of ambient pressure.

The above and other objects and advantageous features of the invention will be apparent to those skilled in the art from reading the following description and from a review of the attached drawings of an exemplary embodiment of the invention and in which:

FIG. 1 is an exploded perspective view of a hydrostatic pressure device incorporating the invention, FIG. 2 is an enlarged side elevational view of a portion of the mounting frame of the device of FIG. 1, FIG. 3 is a perspective view of the device of FIG. 1 assembled and connected to an air-backed transducer served by the device and showing the condition of the position of the envelope under normal atmospheric pressure, FIG. 4 is a perspective view of the device assembled and showing the envelope under a working pressure several times atmospheric pressure, and FIG. 5 is an enlarged elevational view of an end portion of the assembled device showing details of the means for sealing the envelope to the frame.

Briefly stated the invention relates to an ambient hydrostatic pressure sensitive apparatus capable of developing when connected to a closed chamber a gas pressure corresponding to ambient hydrostatic pressure. The several elements of the apparatus are so formed and associated as to provide maximum pressure range of operation at maximum reliability and include for this purpose a substantially cylindrical elastomeric envelope mounted in air-seal condition on a spool-shaped frame to define a variable volume reservoir, the frame being formed with gas passageways to receive gas under pressure from the reservoir and pass the same to the closed chamber of the device being served by the apparatus.

Referring to FIG. 1 of the drawings there is shown in exploded view four main elements of the apparatus including a spool-shaped frame, generally indicated at 12 an elastomeric envelope 14 of substantially cylindrical shape and two clamping rings 16 and 18 which are utilized in securing the envelope 14 on the frame 12. FIG. 3 shows the assembled apparatus, generally indicated by the numeral 10, the envelope 14 being under an outwardly biasing pressure differential as will be explained hereinafter.

The frame 12 includes frusto-conically shaped ends 20 and 22 having grooves 24 and 26 in the respective rim sections 28 and 30, and an intermediate cylindrical section 32. Formed centrally on the longitudinal axis of the spool frame 12 is a central air or nitrogen passageway 34. Communicating radially through the spool frame 12 along the ends 20 and 22 and central portion 32 are formed spaced groups of radially disposed passageways 36. As best seen in FIG. 2 the outer surface of the spool frame 12 is formed with spaced annular grooves indicated at 38 on the intermediate section 32 of the frame and at 40 on the frusto-conical ends 20 and 22. Each group of radially disposed passageways 36 terimnate through the bottom of an associate of the grooves 38 and 40 for reasons to be explained hereinafter.

The envelope 14 prior to assembly on the frame 12 is formed of a butyl rubber compound, such as compound No. NASL–V780, indicated below, and is in a semi-cured condition. Prior to assembly of the envelope 14 on the frame 12 the grooves 24 and 26 are sandblasted, cleaned with a solvent such as toluene, and a primer such as TY PLY T of the Marbon Chemical Division of the Borg Warner Corporation, Washington, West Virginia is applied to the sandblasted surfaces. An adhesive such as Chemlok 220 of a Marbon Chemical Company Division of the Lord Manufacturing Company, Erie, Pennsylvania is then applied over the primer. Thereafter, as shown in FIG. 5, uncured strips of rubber compound, such as compound No. NASL-V791, indicated below:

FORMULAS OF BUTYL RUBBER COMPOUNDS

| Ingredients: | Concentrations, Phr., Compound Number | |
| --- | --- | --- |
|  | NASL-V780 | NASL-V791 |
| Butyl 325 | 100 | 100 |
| Elastopar | 0.75 | 0.75 |
| Zinc Oxide | 5 | 5 |
| ISAF Black (Philblack I) | 75 | 75 |
| Stearic Acid | 0.5 | 0.5 |
| A-C Polyethylene 617-A | 5 | 5 |
| Vistanex LM-MH | 7.5 | 7.5 |
| NBC | 1 | 1 |
| Altax | 1 |  |
| Ethyl Cadmate | 3.5 | 3.5 |
| Sulfur | 0.5 | 0.5 |
| Cure in Steam | 25 minutes at 307° F. | 10 minutes at 307° F. | are employed to fill the grooves 24 and 26 to form an interlayer 42 between the grooved rim of frame 12 and the envelope 14 to be disposed on the spool. The envelope is then positioned on the spool as shown in FIGS. 3 and 5. The uncured interlayer is compounded for compatability with the partially cured butyl rubber compound and to be a faster curing compound than the butyl rubber of the envelope. The clamps 16 and 18 are then secured over the envelope ends above the grooves 24 and 26 and the assembled unit is heat treated at 307° F. for 10 minutes to vulcanize all of the rubber.

Referring to FIG. 3 the end 20 of the frame 12 is threaded adjacent the end of the central passageway 34 to receive a fitting such as pipe 44 for connecting the assembled unit 10 to an air-backed transducer unit 46. Transducer unit 46 is a conventional bilaminar, encapsulated unit comprising transducer discs 48 and 50 mounted on a ring 52 and defining a closed air or nitrogen chamber 54.

In the preferred embodiment shown in the drawings the opposite end 22 of the pressure responsive unit 10 is also threaded or otherwise adapted to receive an intake check valve 56, best seen in FIG. 2, by which the unit 10 may be lightly pressurized with air or nitrogen under pressure. This slight initial pressure results in the slight bulge in the envelope 14 as viewed in FIG. 3. The advantage of initially charging the system with a fluid pressure in excess of atmospheric pressure is to increase the range of hydrostatic pressure in which the apparatus may be usefully employed. The value of initial charge which may be employed when a transducer is served by the unit 10 is the pressure differential which the transducer elements 48 and 50 are able to withstand safely. Thus, if the elements 48 and 50 will safely withstand a 25 p.s.i. differential without cracking then the charging pressure should not exceed 25 p.s.i. In practice applicant has normally employed a 15 p.s.i. initial charge to the gas system. The gas system includes the transducer chamber 54, the central gas passageway 34 and the variable volume reservoir defined by the envelope 14 and frame 12.

Operation of the hydrostatic pressure responsive apparatus including the unit 10 and the transducer 46 will now be explained.

When the apparatus is at the surface of the water in which it is to be used and hence under atmospheric ambient pressure, the envelope 14 is in the position indicated in FIG. 3 and the pressure in transducer chamber 54 and in the variable volume reservoir defined by elastomeric envelope 14 mounted in air-seal condition on spool-shaped frame 12 is at a value above atmospheric pressure dependent upon the initial charge. As the apparatus is submerged ambient hydrostatic pressure gradually increases and the initial pressure differential of say 15 p.s.i. is gradually reduced to zero. In sea water this will occur at approximately the 40 foot depth. Thereafter, as the apparatus is submerged to greater depth the unsupported area of the envelope moves inwardly in the direction of the apertured portions of the frame 12 compressing the air in the system of air chambers and passageways and developing continuously a balance of pressures on opposite sides of the envelope 14 and on opposite sides of the transducer elements 48 and 50. As the depth of submergence increases the elastomeric envelope 14 will gradually be placed under tension resulting from the inward movement thereof as shown in FIG. 4 and the pressure differential is reversed. However, the inward movement of the envelope 14 is limited by ultimate engagement with the frame 12 such that the reverse pressure differential is limited to a desired limit of say 15 p.s.i.

The range of hydrostatic pressure and thus the depth of operation is limited by the ratio of volume of air in the collapsible reservoir defined by envelope 14 and frame 12 to the non-collapsible volume of air in the remainder of the system, i.e. in the chamber 54 and passageway 34.

If ideal isothermal compression is assumed for air in an envelope preinflated to 15 p.s.i., it can be shown by the ideal gas law $pv = nRT$ that the ratio of collapsible volume to non-collapsible volume of the system must be at least 6 to 1 to provide compensation at hydrostatic pressures equivalent to about 500 foot sea depths. Actually the units are preferably designed for a ratio in excess of that required for the desired depth of operation to provide a sufficient surplus of air to compensate for any non-ideal behavior of the air in the system.

The novel spool-shaped structure of the device 10 is particularly advantageous in providing a maximum ratio of collapsible to non-collapsible volume in the system. It is further advantageous in providing such ratio from an elongated frame structure such that it may be readily accommodated in elongated bodies used in underwater variable depth sonar devices which are towed under the water and must offer minimum resistance to passage through the water.

The structure is of further advantage in that the rigid frame offers firm support for the envelope should the device be lowered beyond its intended depth of operation.

A further advantage of the invention resides in the grooved formation of the frame 12 such that the possibility of sticking of the envelope 14 to the frame 12 subsequent to collapse thereon is reduced by the groove formations.

Another advantage of the device is in the manner of attachment of the envelope 14 to the grooved rim portions of the spool-shaped frame 12 such that a complete firm bond is established and the adhesive cord in the grooves 24 and 26 is protected from salt water by the rubber bonded in the grooves.

A further advantage of the invention lies in the approach of the spool-shaped frame surface to the catenary curve inherently assumed by the envelope 14 when under external pressure differential. If desired the surfaces of the frame 12 can be made in true catenary form. The combination of frusto-conical end sections 20 and 22 and intermediate cylindrical section 32 is preferred to reduce manufacturing costs while at the same time providing a satisfactory approach to ideal shape and also to maintain maximum ratio of collapsible to non-collapsible volume.

It is to be understood that gaseous medium other than air may be employed in the above described apparatus and also that an electrically insulating oil may be employed if the transducer is oil backed.

It will be understood that various changes in the details, materials and arrangements of parts, which have been described and illustrated in order to explain the nature of the invention, may be made by those skilled in the art within the principle and scope of the invention as expressed in the appended claims.

We claim:

1. Apparatus responsive to ambient hydrostatic pressure for supplying to a device, served by the apparatus, a gas under pressure corresponding to said ambient hydrostatic pressure comprising:

a spool shaped rigid body having rim sections adjacent each end and recessed from one end thereof to provide a central gas passageway, said one end of said body being adapted for connection to said served device to provide gas intercommunication between said served device and said rigid body gas passageway when said device and body are connected, an elastomeric gas impervious envelope of substantially cylindrical shape mounted on said body and secured in gas tight relation to the rim sections of said spool shaped body to form between said body and said envelope a pressure control reservoir, said body being formed with a plurality of holes to provide gas communication between said reservoir and said gas passageway.

2. Apparatus as set forth in claim 1, said rigid body being formed with a plurality of spaced annular grooves in the surface of said body adjacent said envelope, said plurality of holes being formed through the base of said grooves to facilitate release of said envelope from said body should said envelope be deformed sufficiently in operation to engage said body under ambient hydrostatic pressure.

3. Apparatus as set forth in claim 1 said rim sections being each formed with an annular groove, an adhesive compound deposited on the surfaces of said groove, a bonding compound deposited to fill each of said grooves and adhere to said adhesive compound, said envelope when positioned on said body being in engagement with said bonding compound, and clamp rings secured over said envelope at said rim sections compressing said envelope and bonding compound above said grooves, said bonding compound sealing said adhesive compound from ambient fluid outside said envelope.

4. An automatic pressure compensated acoustic transducer apparatus for operation in variable depth sonar equipment comprising:

an acoustic transducer device including at least one transducer element having an outer surface exposed to ambient hydrostatic pressure and a mounting means forming a gas chamber adjacent an inner side of said element, a spool shaped rigid body having rim sections adjacent each end and recessed from one end thereof to provide a central gas passageway, said one end of said body and said transducer device being adapted for interconnection to provide gas intercommunication between said transducer gas chamber and said rigid body gas passageway, an elastomeric gas impervious envelope of substantially cylindrical shape mounted on said body and secured in gas tight relation to the rim sections of said spool shaped body to form between said body and said envelope a pressure-compensating reservoir, said body formed with a plurality of holes along the length thereof to provide gas communication between said reservoir and said gas passageway.

5. Apparatus as set forth in claim 4, said rigid body being formed with a plurality of spaced annular grooves in the surface of said body adjacent said envelope, said plurality of holes being formed through the base of said grooves to facilitate release of said envelope from said body should said envelope be deformed sufficiently in operation to engage said body under ambient hydrostatic pressure.

6. Apparatus as set forth in claim 4, said rim sections being each formed with an annular groove, an adhesive compound deposited on the surfaces of said groove, a bonding compound deposited to fill each of said grooves and adhere to said adhesive compound, said envelope when positioned on said body being in engagement with said bonding compound, and clamp rings secured over said envelope at said rim sections compressing said envelope and bonding compound above said grooves, said bonding compound sealing said adhesive compound from ambient fluid outside said envelope.

7. Apparatus as set forth in claim 4 including means for admitting gas under pressure to said apparatus to establish an initial gas pressure within the pressure differential for which said transducer device is designed to operate without damage thereto.

References Cited by the Examiner
UNITED STATES PATENTS 3,018,466   1/1962   Harris _____ 340—8

CHESTER L. JUSTUS, *Primary Examiner.*

J. P. MORRIS, *Assistant Examiner.*